(12) United States Patent
Rust et al.

(10) Patent No.: US 7,239,522 B2
(45) Date of Patent: Jul. 3, 2007

(54) METHODS AND APPARATUS FOR REDUCING THE OPPORTUNITY FOR ACCIDENTAL REMOVAL OR INSERTION OF COMPONENTS

(75) Inventors: Robert A. Rust, Boise, ID (US); Thomas W. Ives, Boise, ID (US)

(73) Assignee: Hewlett-Packard Development Company, L.P, Houston, TX (US)

( * ) Notice: Subject to any disclaimer, the term of this patent is extended or adjusted under 35 U.S.C. 154(b) by 322 days.

(21) Appl. No.: 10/874,727

(22) Filed: Jun. 23, 2004

(65) Prior Publication Data
US 2004/0235331 A1 Nov. 25, 2004

Related U.S. Application Data

(62) Division of application No. 09/678,210, filed on Sep. 26, 2000, now Pat. No. 6,768,643.

(51) Int. Cl.
*H05K 5/00* (2006.01)

(52) U.S. Cl. .................. 361/732; 361/801; 361/785; 710/301

(58) Field of Classification Search ........ 361/683–686, 361/756, 790, 797, 752, 785, 801, 736; 710/300–301; 211/41.17; 439/557, 64
See application file for complete search history.

(56) References Cited

U.S. PATENT DOCUMENTS

| | | | | |
|---|---|---|---|---|
| 5,619,660 A | * | 4/1997 | Scheer et al. | 710/301 |
| 5,803,762 A | * | 9/1998 | Green | 439/347 |
| 6,738,851 B2 | * | 5/2004 | Lin | 710/302 |
| 6,952,341 B2 | * | 10/2005 | Hidaka et al. | 361/685 |
| 2004/0165314 A1 | * | 8/2004 | Fujiwara et al. | 360/133 |

* cited by examiner

*Primary Examiner*—Tuan Dinh
*Assistant Examiner*—Hung S. Bui

(57) ABSTRACT

Methods and apparatus for preventing the accidental or premature decoupling of a device from a support chassis. The apparatus includes a moveable securing member. The moveable securing member is configured to be moved from a first position to a second position, wherein one of the first and second positions permits removal of the device from the support chassis, while the other position prevents removal of the device. An actuator coupled to the moveable securing member is responsive to an authorization command, so that a user or a controller can cause the securing member to be moved. The controller can be configured to operate in response to either or both of a user input or an error detection signal corresponding to the device.

8 Claims, 10 Drawing Sheets

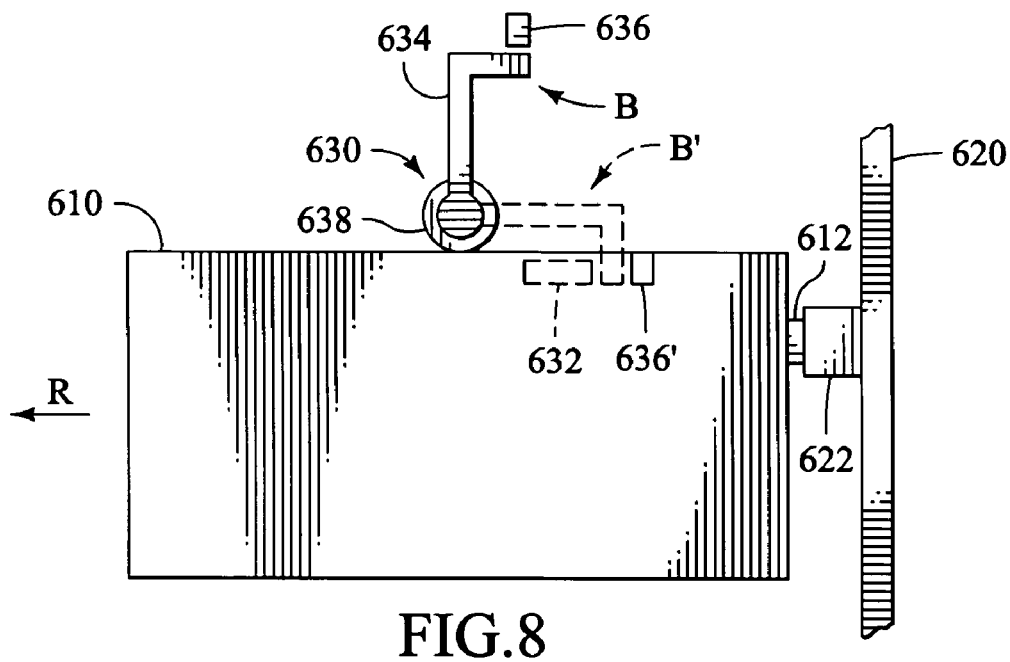
FIG.8
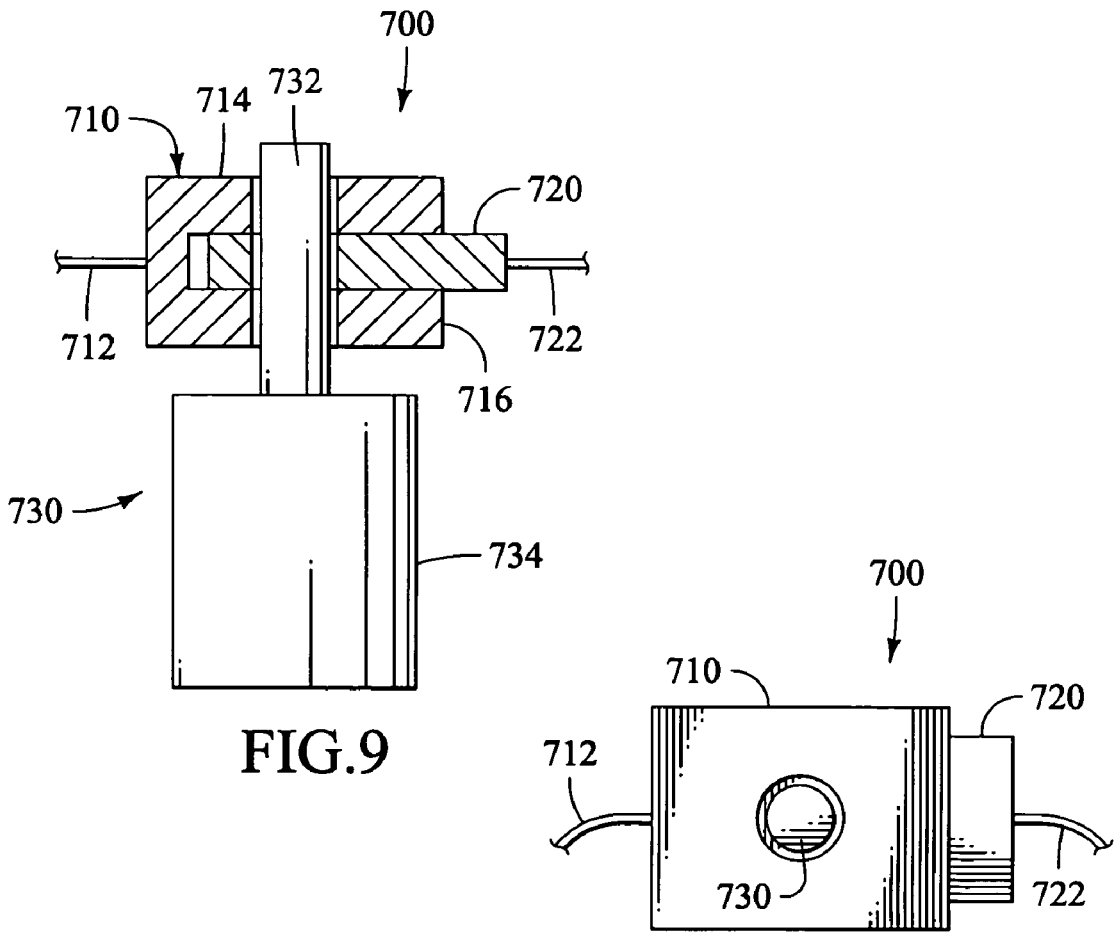
FIG.9
FIG.10

METHODS AND APPARATUS FOR REDUCING THE OPPORTUNITY FOR ACCIDENTAL REMOVAL OR INSERTION OF COMPONENTS

CROSS REFERENCE TO RELATED APPLICATIONS

This application is a divisional application under 35 U.S.C. § 120 of U.S. patent application Ser. No. 09/678,210, filed Sep. 26, 2000 now U.S. Pat. No. 6,768,643, which is hereby incorporated by reference herein in its entirety.

FIELD OF THE INVENTION

This invention pertains to couplings between components, particularly electronic and electrical components, and methods and apparatus to restrain the couplings from being prematurely or accidentally connected or disconnecting.

BACKGROUND OF THE INVENTION

It is often desirable to secure an electrical coupling so that the connection cannot be accidentally disconnected, either through human error or otherwise. For example, a critical piece of equipment, such as a heart monitor module, can be connected to a power supply. For many reasons it is desirable to allow the unit to be configured such that it can be disconnected from the power supply without having to break a permanent connection, such as a solder connection. This allows the module to be moved from location to location, as well as to be removed from service for maintenance. In this example, one risk is that a person can accidentally trip over the power cord, disconnecting the unit from the power supply. For obvious reasons, this is to be avoided.

Another application where it is desirable to secure an electrical coupling is in computer and computer-related applications. For example, a computer memory array consists of a number of individual memory modules which are inserted into an array, which comprises a rack supported by a frame. Each memory module is provided with an electrical connector to allow data to be transferred to and from the module, and to provide electrical power to the module. The frame also supports an electrical board (also known as a "plane"), which provides electrical routing to connectors configured to mate with the electrical connectors on the individual modules. The memory array can also comprise support modules such as power supplies, cooling fans, local diagnostic and control modules, etc. These support modules also connect to the plane via connectors. Generally the modules are secured into the rack or the frame by a latch mechanism, preventing the module from becoming disconnected from the plane as a result of incidental impact. However, from time to time a module may need to be removed from the array for service or replacement or the like. In this instance the latch securing the module connector into the plane connector is actuated to allow the module to be removed by an operator. The risk is that the operator can accidentally remove the wrong module.

As an example, consider FIG. 1 which depicts an oblique view of a computer system 2 which includes a memory array device "A" which is connected to a main controller "C" by cable 4. The memory array "A" includes an enclosure 12 which fits over a frame (not shown). The frame supports a variety of modules which electrically connect to a plane (also not shown) by electrical connectors. The modules can include memory modules 5, 6, 7 and support modules 8, 9, 10 and 11. The support modules can include local controllers, power supplies, and cooling units. Each memory module is secured into the frame by a latch 14. The controller "C" can be connected to other memory arrays similar to the device "A", and can also be provided with a user display 20.

One function which can be performed either by a local controller within the memory array "A" or by the main controller "C" is a routine diagnostic program. The diagnostic program can detect errors or malfunctions within individual modules in the array "A". When a module is detected which may need to be serviced or replaced, the user can be notified through the user display 20. As part of the diagnostic program, the controller "C" (or a local controller) can electronically remove the module from service, either automatically or as authorized by a user. Electronically removing the module from service typically encompasses identifying a redundant module to perform the capabilities of the module to be serviced, and identifying to the system that the defective module should no longer be used to perform its normal functions. Electronically removing the module from service can also include depriving the module of electrical power so that when the electrical connections between the module and the plane are decoupled, arcing between the contacts does not occur. Once the defective module has been electronically removed from service, it can be physically removed by an operator.

At this point, the operator ideally removes the module from the array so that the module can be serviced or replaced. However, it is possible that the operator can accidentally remove the wrong module. This is not an unlikely event in a large array system which can have hundreds of memory arrays, each memory array having tens of modules. The consequences can be significant. For example, if an in-service power module or a local control module is disconnected from an array, it is possible that all data stored by the array can be lost. While typically each module in an array has a redundant back-up module, if the active module is accidentally removed (versus the defective back-up module), then the whole array can be affected.

As another example, typically memory modules are actively backed-up using a dedicated module to back up two or more primary modules. For example, with respect to FIG. 1, a "data stripe" S1 can consist of two primary memory modules 5 and 6, and a back-up module 7. A single back-up module 7, when used in conjunction with a back-up algorithm and a computer processor, can be used to back-up the contents of two primary modules 5 and 6. For example, the back-up module 7 can store the binary sum of the modules 5 and 6. In this way, if memory is lost from module 5, it can be restored merely by processing the contents of modules 6 and 7 using the back-up algorithm to calculate the lost data in module 5. However, if an operator were to accidentally remove one of these modules from service before it has been operationally removed from service by the array controller, then any data lost in the two remaining modules cannot be restored, and the data can be irretrievably lost.

The system can be further complicated by advances in memory arrays, for example where the back-up module is selected by a controller, rather than being the third module in a memory stripe. In this instance, the back-up module can be one of any of the modules in the array. Additionally, in some configurations the memory stripe consists of five memory modules, and so it is not always obvious that the third module down is the back-up module. These advanced systems make it difficult for an on-site operator to know which modules are active, and which modules are performing what functions. As a result, it is often necessary to bring in an off-site technician with special knowledge of the system to remove the defective module. This of course results in delays in getting the defective module serviced, and increases the cost to the user of having the module serviced.

Further complicating the situation is the fact that the user may move modules from location to location within the array, so that the resulting configuration does not correspond to the original configuration. For example, the original configuration can identify module "X" as being associated with slot "Y" in the array. The module is thus tagged with an identifier visible to the user, identifying the module as "module X". Further, the diagnostic program can be configured to identify a module by its location within the array. Thus, if the diagnostic program determines that the module in slot "Y" is defective, and the configuration indicates that module "X" is in slot "Y", the program will notify the user that "module 'X' needs to be removed for service". The user will then locate the module which is tagged "module X", and will remove it from service. However, if module "X" has been moved to a new location, the user can end up removing the wrong module.

One solution is to provide an indicator on the module, or next to the module, such as a light emitting diode (LED), which illuminates when the module has been operationally removed from service. This indicates that the module can now be physically removed from the array. However, there is still nothing in this configuration which actually prevents the operator from removing a module from the array before it has been removed from service.

The examples given above are only a small sampling of the overall problem regarding accidental disconnecting of electronic and electrical couplings. The problem not only applies to power connections and modules in computer arrays, to any situation where an electronic/electrical coupling which can be accidentally decoupled is to be avoided. Further, the problem can also apply to any kind of connection where accidental or premature decoupling of connectors is to be avoided, including hydraulic and pneumatic systems. What is needed then is a way to prevent the accidental decoupling of connectors, and in particular electrical and electronic connections.

SUMMARY OF THE INVENTION

The invention includes methods and apparatus for preventing the accidental or premature decoupling of an electrical connection, the electrical connection comprising two electrical connectors which can be coupled and decoupled. One embodiment the invention includes a securing apparatus configured to secure the coupling of a first electrical connector to a compatible second electrical connector. The apparatus includes a moveable securing member. The moveable securing member is configured to be moved from a first position which prevents the first and second electrical connectors from being decoupled, to a second position which allows the first and second electrical connectors to be decoupled. The apparatus further includes an actuator configured to move the securing member between the first and second positions. The actuator is responsive to an authorization command, so that a user or an automatic controller can cause the securing member to be moved between positions. The securing apparatus can further be provided with a securing member sensor. The securing member sensor can be configured to detect when the securing member is in the first position or the second position, and to generate a position signal in response thereto. The position signal can be used by an operator or a controller to determine whether or not the electrical connectors can be physically decoupled.

A second embodiment of the invention includes an electronic system comprising an array of electronic modules and an electrical plane. Each module has a first electrical connector configured to electrically couple with a compatible, corresponding second electrical connector which is mounted to the plane. The system further includes at least one interlock device. The interlock device comprises a securing member configured to be moveable to a first position to engage an associated module and thereby arrest relative movement between the associated module's first electrical connector and the corresponding second electrical connector. The securing member is further configured to be moveable to a second position to disengage the associated module and thereby allow relative movement between the associated module's first electrical connector and the corresponding second electrical connector. As in the first embodiment, a position sensor can also be provided.

A method in accordance with the present invention provides a method for securing a first electrical connector supported by a first structure to a second electrical connector supported by a second structure. The method includes the steps of providing an arresting surface on the first structure, and providing a moveable securing member. The securing member is moved to a first position which allows relative movement between the structures. One of the two structures is then moved relative to the other structure to bring the electrical connectors onto electrical mating contact. Then the securing member is moved to a second position in proximity to the arresting surface to thereby restrict relative movement between the first and second structures, or the like. The method can further include the step of moving the securing member back to the first position, and moving one of the structures relative to the other structure to move the electrical connectors out of electrical mating contact. Additionally, a user can be notified when the securing member has been moved back to the first position. Preferably, in each case the movement of the securing member from one position to the other position is in response to an authorization command issued by a user or an automatic controller.

DESCRIPTION OF THE DRAWINGS

FIG. 8 is a side elevation diagram depicting an alternate embodiment of the present invention for securing a module connector into a second electrical connector.

FIG. 9 is a side elevation sectional view depicting an alternate embodiment of the present invention for directly securing a first electrical connector to a second electrical connector.

FIG. 10 is a plan view of the electrical connector of FIG. 9.

DETAILED DESCRIPTION OF THE INVENTION

Figure 1:
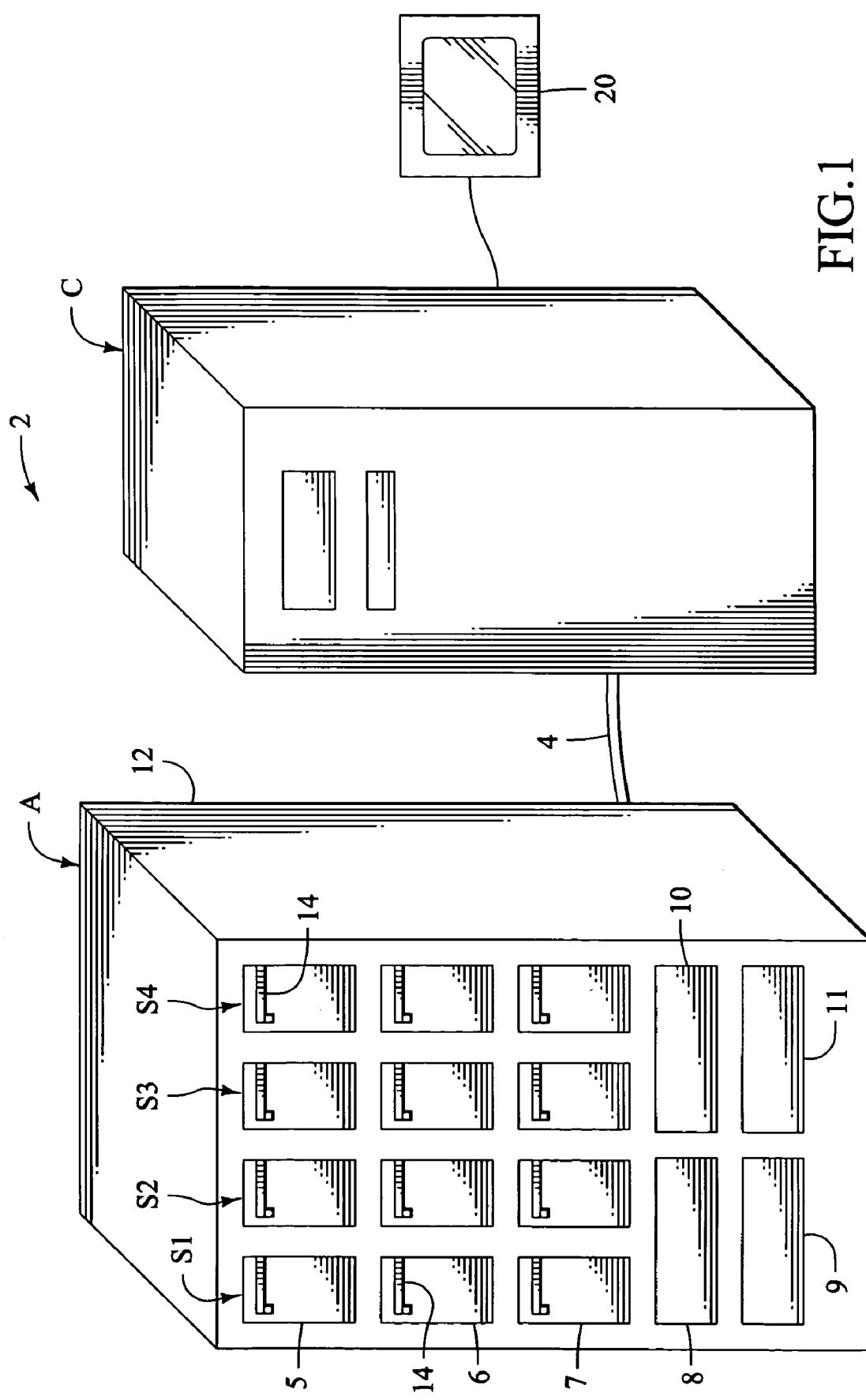
FIG. 1 is an isometric diagram of a data array system of the prior art.

The invention includes methods and apparatus for resisting the accidental or premature decoupling of an electrical connection, the electrical connection comprising two electrical connectors which can be coupled and decoupled. In one embodiment, the invention includes a securing apparatus configured to secure the coupling of a first electrical connector to a compatible second electrical connector. The apparatus includes a moveable securing member configured to be moved from a first position to a second position. In the first position the securing member resists forces which can cause the first and second electrical connectors to become decoupled. In the second position the securing member allows the first and second electrical connectors to be decoupled. The apparatus further includes an actuator configured to move the securing member from the first position to the second position, and visa-versa. The actuator is responsive to an authorization command, so that a user or a controller can cause the securing member to be moved between positions.

A second embodiment of the invention includes an electronic system comprising an array of electronic modules and an electrical plane. Each module has a first electrical connector configured to electrically couple with a compatible, corresponding second electrical connector which is mounted to the plane. The system further includes at least one interlock device. The interlock device comprises a securing member configured to be moveable to a first position to engage an associated module and thereby arrest relative movement between the associated module's first electrical connector and the corresponding second electrical connector. The securing member is further configured to be moveable to a second position to disengage the associated module and thereby allow the module connector to be removed from the second corresponding electrical connector.

The present invention further includes a disk array system comprising a plurality of disk removably supported in a chassis, and at least one apparatus configured to secure at least one of the disk devices in the chassis. The securing apparatus is configured to be responsive to an authorization command to prevent a user from removing the associated disk device from the chassis in the absence of the authorization command. In the presence of the authorization command, the disk device can be removed from the chassis by the user. In one embodiment the securing apparatus comprises a moveable securing member. The securing member is configured to be moved, in response to the authorization command, from a first position which prevents the associated disk device from being removed from the chassis, to a second position which allows the disk device to be removed from the chassis. In another embodiment, when the disk device has a release mechanism configured to release the disk device from the chassis when the release mechanism is actuated by the user, the securing apparatus comprises a moveable release mechanism securing member. This moveable securing member is configured to be moved, in response to the authorization command, from a first position which allows the user access to the release mechanism, to a second position which denies the user access to the release mechanism.

In the following discussion we will use the term "electrical connector" to mean a device configured to be connected or coupled to a compatible, mating counterpart. Typically, each electrical connector is further connected to a conductor, such as a wire. When the two electrical connectors are coupled, they can convey electrical current between them and into the associated conductors. The electrical current can consist of electrical power, as for powering a circuit or a device such as a fan or a disk drive. The electrical current can also consist of electrical signals, such as data or computer readable instructions. In addition to conveying electric current, a connector can also be configured to convey other forms of electromagnetic signals, such as optical signals from one fiber optic cable to another. The invention is also broad enough to encompass other types of connectors, such as hydraulic and pneumatic connectors. Accordingly, when we use the expression "connector", it should be considered as encompassing all types of connectors which can be coupled and decoupled, and which convey data or power from one point to another. Although the embodiments shown and described below all pertain to electrical and electronic systems, it is understood that the invention can also be applied to other types of systems, such as hydraulic systems and pneumatic systems, by way of example only. Further, a single "connector" can comprise a plurality of connections, such as in a computer cable where a large number of connector pins can be present within a single connector.

In the following discussion when we use the terms "couple" and "decouple", we mean respectively physically connecting and disconnecting two connectors. We will also use the expression "electrically disconnect" in the following discussion. By this latter term we mean the flow of electrical current between the two connectors is intentionally ceased, although the connectors are still physically coupled. Electrically disconnecting connectors prior to physically separating the connectors can be important to preserving data in a data transfer realm, and in preventing electrical arcing between contacts within the connectors.

Figure 2:
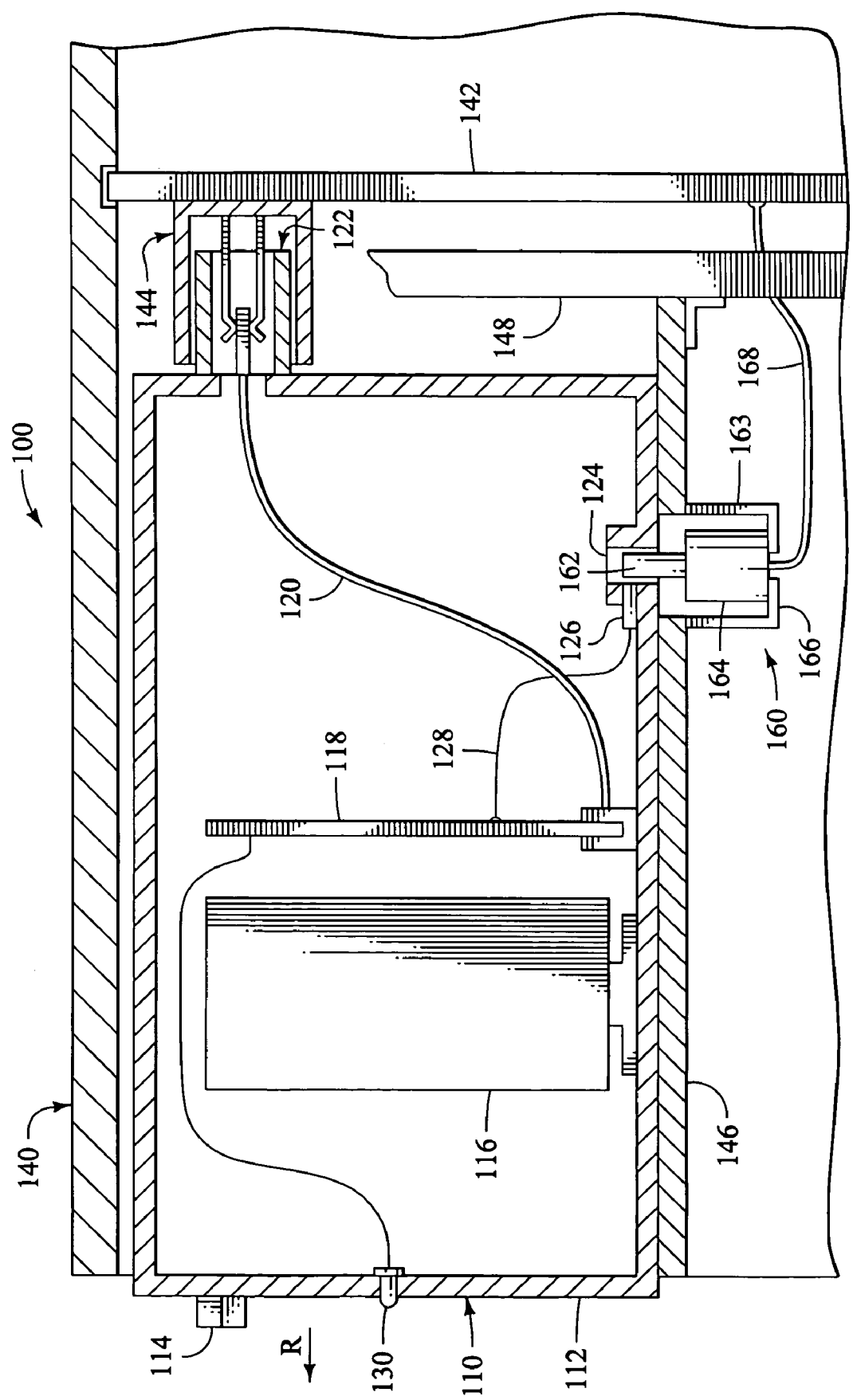
FIG. 2 is a side elevation sectional view of one embodiment of the present invention for securing a module into an electrical connection, showing the securing member in a first position.

Turning now to FIG. 2, a first embodiment of an apparatus in accordance with the present invention is depicted. FIG. 2 depicts a partial side sectional view of a computer array 100, which can be similar to the prior art array "A" of FIG. 1. The system 100 of FIG. 2 includes at least one module 110. The module is provided with a module connector 122 which allows electrical power to be provided to the module, as well as allowing electronic data to be transferred to and from the module. In this example, the module is a memory module, although it can be any type of module. Examples of other types of modules include power modules, cooling fan modules, controllers, etc. Another example of a similar configuration to that of the computer array system depicted in FIG. 2 is a control panel in a processing plant, such as a refinery or a chemical manufacturing plant. A single control panel can house a number of instruments which are housed in discrete modules, and which can record process variables and control different aspects of the process. In all of these examples it is desirable to be able to remove individual modules for servicing or upgrades, but accidental or premature removal of a module can result in undesirable results.

The module 110 is supported within a frame or chassis 140 by a shelf 146 which is in turn supported by structural member 148. In addition to supporting the module 110, the chassis 140 further supports an electrical plane 142 which provides electrical power routing and electronic signal routing to the module 110 via the plane connector 144. The plane connector is thus configured to couple with the module connector 122. The connectors 144 and 122 are configured such that the memory module 110 can be pulled out of the chassis for servicing or replacement. If the module were "hard wired" to the plane 142, it would be extremely difficult to remove the module, and would require a considerable expenditure of time and effort. It is thus desirable that the connectors be configured such that they can be easily coupled and uncoupled. As depicted in FIG. 2, connectors 144 and 122 are in a coupled state.

In the example shown in FIG. 2, the memory module 110 is provided with a latch 114 which secures the module to an edge of the chassis (not shown). By pulling the latch 114, the module can be removed from the chassis 140. However, as explained earlier, the module may not be the correct module to be removed, or may not yet be ready for removal. Thus, even though the module is provided with a latch 114 which secures it to the chassis 140, this does not prevent accidental or premature removal of the module.

The module 110 in the example depicted in FIG. 2 further includes a disk drive 116 and a circuit board 118. The circuit board 118 can be configured to regulate the transfer of data to and from the disk drive, as well as to perform diagnostic and control functions. The circuit board 118 is in signal and electrical communication with the main array via conductors 120, which are connected to the module connector 122. An enclosure 112 protects the internal components of the module, such as the disk drive 116 and the circuit board 118.

The array system 100 is further provided with an interlock device 160, in accordance with the present invention. The interlock device includes a securing member 162 and an actuator 164. As depicted, the actuator is supported by a bracket 163 which suspends the interlock device from the shelf 146 in a position beneath the module 110. An opening in the shelf 146 allows the securing member 162 to pass upward and into a receiving opening 124 which is disposed within the housing 112 of the module. As shown in FIG. 2, the securing member 162 is in a first position which inhibits movement of the module out of the chassis. That is, if the module 110 is pulled in direction "R" while the securing member is in the position shown, the module housing 112 will strike the securing member 162, thus keeping the module from being removed, and consequently maintaining the connectors 122 and 144 in their coupled state.

Figure 3:
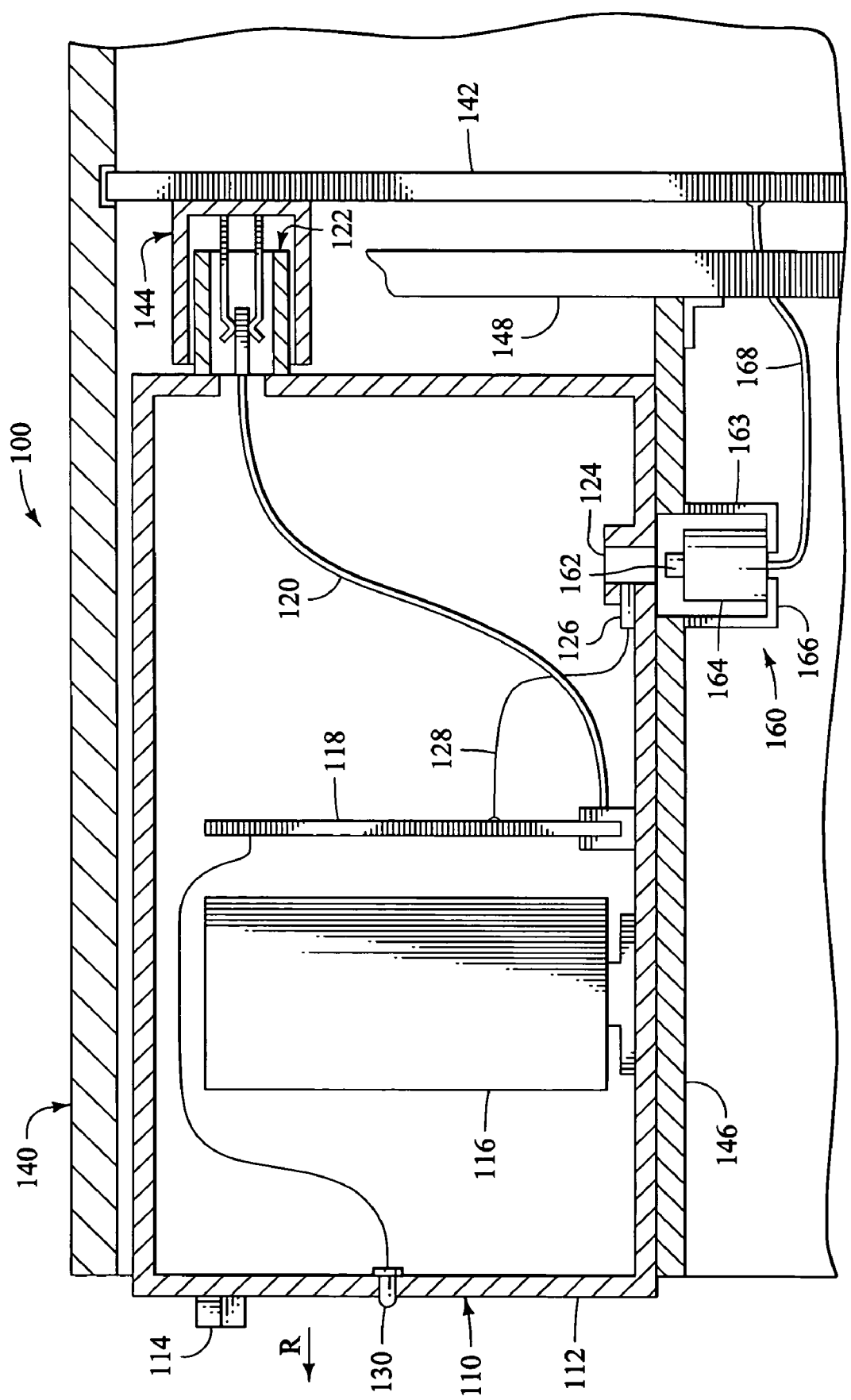
FIG. 3 is a diagram of the apparatus depicted in FIG. 2, but showing the securing member in a second position.

Turning to FIG. 3, the array 100 of FIG. 2 is depicted, however in FIG. 3 the securing member 162 has been moved to a second position so that it is not intruding into the module housing 112. When the securing member 162 is in the position shown in FIG. 3, the module 110 can be removed from the chassis 140, and the electrical connectors 144 and 122 can be decoupled.

The actuator 164 can comprise, for example, an electrically activated solenoid. The solenoid can be electrically connected to the plane 142 via the conductor 168. In this manner a controller (not shown) which can be configured to monitor the status of the array 100 can activate the solenoid to move the securing member from the secured first position, depicted in FIG. 2, to the unsecured second depicted in FIG. 3. Preferably, the solenoid 164 is configured such that it positions the securing member 162 in the secured first position depicted in FIG. 2 when the solenoid is powered. That is, when electrical power is supplied to the solenoid, it acts to secure the module in the chassis via the securing member 162. This is advantageous since if the main power to the array is disconnected, as for example when the whole array is taken out of service, then the modules can be removed.

The interlock device can be complemented by a securing member position sensor 126, which can detect the presence or absence of the securing member. When the securing member is in the first position depicted in FIG. 2, the position sensor generates a position signal to indicate the presence of the securing member. This signal basically indicates that the module 110 is secured within the chassis 140, and generally cannot be removed in the current state. The position sensor 126 can be electrically connected to the circuit board 118 via the conductor 128 so that the position information can be relayed to the plane 142. The position information can then be routed via the plane to a controller which can be configured to provide the information to the overall system, and to a user of the system. In addition to providing securing member position information via the plane, the module 110 can also be provided with an indicator, such as LED 130, which indicates whether or not the module is secured within the chassis 140 by the interlock device 160. Preferably, the LED is unlit when the securing member is engaged with the module, and unlit when the module has been authorized for removal from the chassis.

A further use of the securing member position sensor 126 is to determine if the actuator 164 has failed. If the sensor determines that the securing pin 162 is in the retracted position depicted in FIG. 3 when in fact the pin should be extended as depicted in FIG. 2, then this suggests an actuator malfunction. In this event, the module 110 could accidentally be removed from the array. The controller can detect this actuator malfunction and can then operationally remove the module from service to prevent any loss of data or function should the module accidentally be removed.

The operation of the interlock device 160 of FIGS. 2 and 3 within the overall computer system will be described more fully below.

Several variations on the embodiment of the invention depicted in FIGS. 2 and 3 can be employed, all within the spirit of the invention. For example, the actuator 164 can be located within the module 110, and the securing member 162 can be positioned to move into an opening formed within the chassis 140, to thereby arrest movement of the module with respect to the chassis. Further, the sensor 126 can be positioned within the sensor to detect the position of the securing member 162.

In general, as can be seen by FIG. 2, the invention includes providing a securing member which is moveable between a first position and a second position. In the first position the securing member arrests relative movement between the module and the chassis. In the second position the securing member allows relative movement between the module and the chassis. The securing member is moveable between the first and second positions by an actuator, and the actuator is responsive to an authorization command. The securing member can be a pin as indicated in FIG. 2, or any other structure which can be used to arrest relative movement between two objects, including a latch device. Likewise, the actuator can be any device which is configured to move the securing member from the first position to the second position. For example, the actuator an be an electrical solenoid as indicated in FIG. 2, or a hydraulic actuator, a pneumatic actuator, a linear positioner, a rotary motor, or a spring. The securing member does not need to be connected directly to the actuator, but can be indirectly connected.

Figure 4:
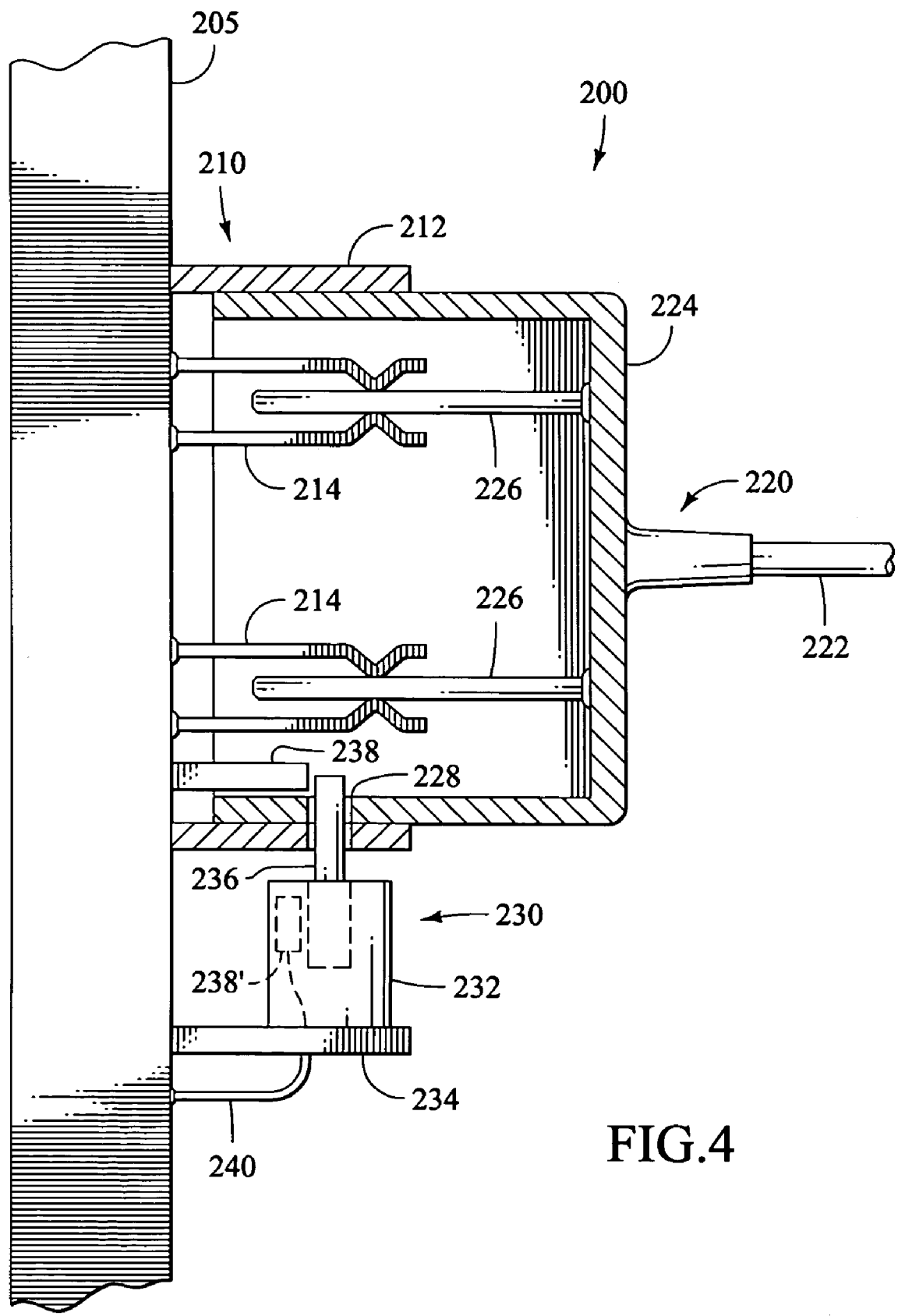
FIG. 4 is a side sectional view depicting how two electrical connectors can be secured using an apparatus in accordance with the present invention.

A second example of the use of an interlock device in accordance with the present invention is depicted in FIG. 4. FIG. 4 shows a side elevation sectional view of an electrical/electronic connection 200. The electrical connection 200 consists of a first connector 210 and a second connector 220. As shown, the first connector 210 is connected to a board 205, such as an electrical plane similar to the plane 142 of FIG. 3. The first connector 210 comprises first electrical contacts 214 and a first housing 212 which provides mechanical protection for the contacts 214, and also aids in aligning the first connector 210 with the second connector 220. The second connector 220 is connected to a cable 222, and includes second electrical contacts 226 which are configured to mate, or couple, with the first electrical contacts 214, as depicted. The second connector 220 also comprises a second housing 224, which acts to protect the second contacts 226 and aids in aligning the second connector 220 with the first connector 210. An example of the electrical connection 200 is a data cable connected to an array such as array 100 of FIG. 3, and which is used to transfer data from the array to a main controller. In this example, the second connector 220 is connected to the cable, and the first connector 210 is connected to the data array.

Supported from the electrical plane 205 of FIG. 4 is a support bracket 234, which supports an interlock device 230. The interlock device can function in a manner similar to the interlock device 160 shown and described in FIGS. 2 and 3. Specifically, the interlock device 230 includes a securing member 236. The first connector housing 212 and the second connector housing 224 have openings 228 disposed therein, which, then the second connector 220 is coupled with the first connector 210, align to provide a hole through which the securing member can pass, as shown in the figure. The interlock device 230 further comprises an actuator 232. The actuator 232 can be a solenoid, and can be powered by a power source from the plane 205 by conductor 240. In this way, the plane 205 can route a signal to the actuator 232 to cause the actuator to move the securing member 236 from a first position (depicted in FIG. 4), to a second position where the securing member is retracted from the hole 228 in the connector housings 212 and 224. Thus, when the securing member 236 is in the position depicted in FIG. 4, it acts to restrict movement between the connector housings 212 and 224, thus resisting decoupling of the electrical contacts 214 and 226. When the securing member is moved to a second position (not shown) where it is retracted from the opening 228, the connectors 210 and 220 can be decoupled. The interlock device 230 can thus aid in preventing accidental removal of a cable connected to a computer system. In a computer system having a large number of cable connection configurations similar to that depicted in FIG. 4, the interlock device can be used to allow one cable to be disconnected from the plane, while securing the remaining cables and protecting against accidental removal of a cable.

The interlock device 230 can be further provided with a securing member sensor 238 which can be affixed to the plane 205. The sensor acts similar to the sensor 126 of the apparatus shown and described in FIGS. 2 and 3. That is, the sensor 238 is configured to detect when the securing member 236 is in one position or the other, and to generate a position signal in response thereto. This signal can be routed to the plane 205, and from there to a controller to provide system information and to notify a user regarding the status of the interlock device 230. In addition to being mounted to the board 205 as shown, the sensor 238 can also be mounted in an alternate position 238' within the actuator. This alternate position for the sensor 238' can be useful where the space within the connector housings 212 and 224 is limited. As described above with respect to FIGS. 2 and 3, the sensor 238 can also be used to detect an actuator malfunction, and the controller can then use this information to operationally remove the module from service.

Turning to FIG. 8, an alternate embodiment of an interlock device in accordance with the present invention is depicted. FIG. 8 shows a side elevation view of a module 610 which has a first connector 612, allowing it to be connected to the plane 620 via the second connector 622. This configuration of the module and plane is similar to the configuration depicted in FIG. 2. The system depicted in FIG. 8 is further provided with an interlock device 630, which is different than the interlock device 160 depicted in FIGS. 2, 3 and 4. In FIG. 8, the interlock device 630 includes an "L" shaped securing member 634. The securing member 634 is connected to an actuator 638, which is configured to rotate the securing member from the first position "B" to the second position shown in outline and indicated by "B'". This is to be contrasted with the actuator 164 of FIG. 2, which moves the securing member 162 translationally. In FIG. 8, when the securing member is moved to the second position B' it is moved in proximity to a tab 632 which is affixed to and protrudes from the side of the module 610. The tab 632 provides an arresting surface to restrict relative movement between the module 610 and the plane 620. That is, when the securing member is in the second position B', the tab 632 prevents the module 610 from being moved in the direction "R", since the tab will contact the securing member 634, thus arresting movement of the module 610. Consequently, the connection between connectors 612 and 622 will remain secure when the securing member is in position B'. However, when the securing member 634 is moved to position B, the module 610 is free to be removed in direction "R".

As with the embodiments shown and described in FIGS. 24, the interlock device 630 of FIG. 8 can also be provided with a position sensor 636, which is configured to detect which of the two positions the securing member 634 is in, and to report the position information to a controller or to a user. The position sensor can be mounted to the chassis (not shown) of the array, or alternately it can be attached to the module as indicated by position 636', or it can be mounted inside the actuator, as indicated in FIG. 4. The mounting of the sensor to the chassis or internally in the actuator can also be used in the embodiment depicted in FIG. 2, which shows the sensor 126 as being mounted within the module 110.

FIGS. 9 and 10 depict yet another embodiment of an interlock device in accordance with the present invention. FIG. 9 depicts a side elevation section view of an electrical connection 700. The electrical connection includes a first connector 710 which is connected to a first conductor wire 712, and a second electrical connector 720 which is connected to a second conductor wire 722. The first connector 710 is a "U" shaped connector, with compliance between the upper portion 714 and the lower portion 716, allowing the second connector 720 to matingly couple with the first connector 710 and provide an electrical connection there between. FIG. 10 is a plan view of the electrical connection 700 of FIG. 9.

As seen in FIGS. 9 and 10, the first electrical connector 710 and the second electrical connector 720 each have a hole disposed therein, such that when the two connectors are coupled, the holes align, thereby creating a passageway intersecting the two connectors. An interlock device 730 is provided with a securing member 732 which is configured to pass into the passageway intersecting the two connectors, to thus restrict relative movement there between. The interlock device 730 further comprises an actuator 734 which is configured to move the securing member 732 from the securing first position shown in FIG. 9 to a second unsecured position (not shown). In the second, unsecured position the securing member is removed from the passageway which intersects the two connectors 710 and 720, thus allowing relative movement there between. As with the embodiments depicted in FIGS. 2-4 and 8, the interlock device 730 of FIG. 9 can also be provided with a securing member position sensor to provide information regarding the position of the securing member 732 with respect to the passageway formed between the connectors 710 and 720. In this way a user or an electronic controller can determine whether the two connectors 710 and 720 are free to be uncoupled or not, or if there has been an actuator malfunction.

Figure 12:
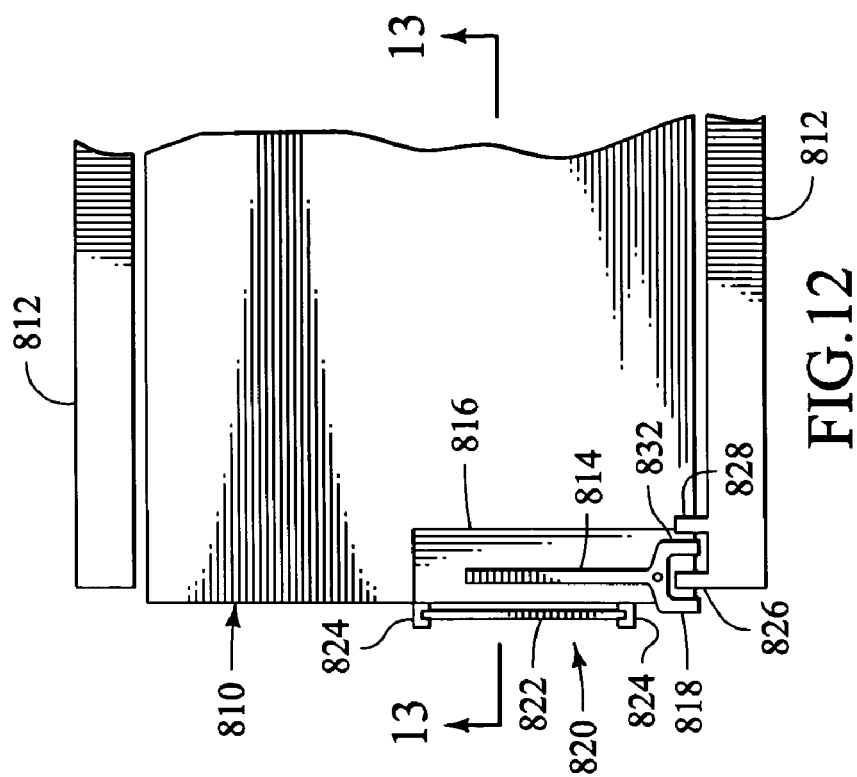
FIG. 12 is a plant elevation view of the securing device shown in FIG. 11.
Figure 11:
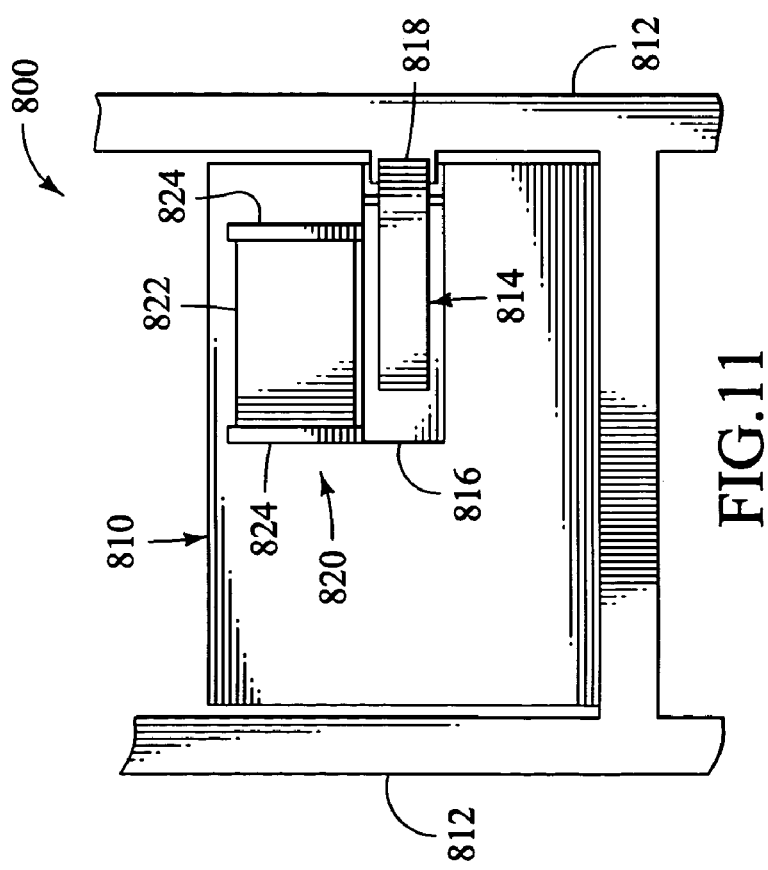
FIG. 11 is a front elevation view of a module which uses a securing device in accordance with an alternate embodiment of the present invention.
Figure 13:
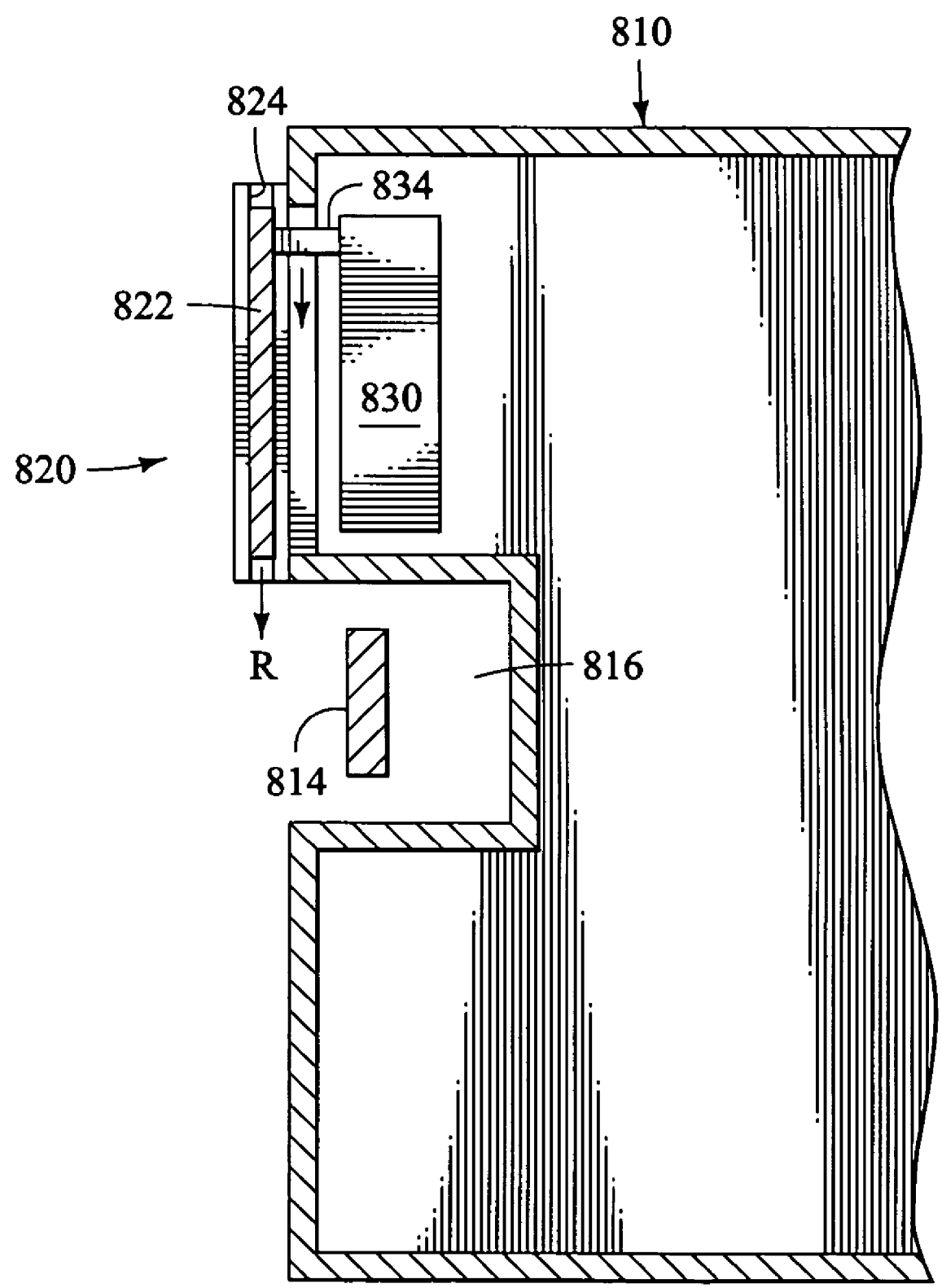
FIG. 13 is a sectional side elevation view of the securing device shown in FIGS. 11 and 12.

With reference to FIGS. 11 through 13, another embodiment of the present invention is shown. In this embodiment, rather than locking the module in place with a securing member to secure the connectors in a coupled state, a lock-out device is used to remove access to a release mechanism which is in turn used to release the module from a chassis supporting the module. Turning to FIG. 11, a front elevation view of a section of an array 800 is shown. The array 800 comprises a chassis 812 which supports a module 810. The array 800 can be similar to the array 100 depicted in FIG. 3, and the module 810 can be similar to the module 110, except that the securing device is different, as will be described further below. The module 810 includes a connector (not shown) similar to the connector 122 of FIG. 3, which couples with a connector (also not shown) supported by the chassis 812. The module 810 further includes a locking device 814, which is a handle used to push the module into the chassis so that the connectors couple. When the module connector is seated in the chassis connector, the handle 814 fits into a recess 816 in the front of the module 810. A flange 818 on the handle is used to push the module out of the chassis when the handle is pulled in the outward direction.

The module 810 is further provided with a securing device 820, which comprises a release mechanism securing member, being a moveable plate 822 which is slidably supported in guides 824. In this manner the moveable plate can move in an upward and downward direction relative to the figure. Turning to FIG. 12, a top sectional view of the array 800 of FIG. 11 is shown. As can be seen, the handle 814 also comprises a second flange 832 which presses against the inside of chassis lip 826 so that when the handle is pushed into the recess 816, the handle flange 832 pushes the module 810 into the chassis 812. The arrangement of the first handle flange 818 is also shown. It is thus apparent that when access is denied to the handle 814, the module cannot be pushed out of the chassis, and the coupling of the module and chassis connectors will remain intact. The moveable plate is also shown in FIG. 12. The moveable plate 822 is positioned in front of the recess 816. As can be seen by viewing FIGS. 11 and 12 together, when the plate is moved "down" from the position depicted in FIG. 11, it will cover the left side of the handle, being the portion of the handle used by an operator to free the module from the chassis.

Turning now to FIG. 13, a side elevation sectional view of the array 800 depicted in FIGS. 11 and 12 is shown. The securing device 820 further comprises an actuator 830 which is connected to an actuator member 834. The actuator member is in turn connected to the moveable plate 822. When the actuator is operated, the actuator member 834 moves in the downward direction, as indicated by the arrow, which in turn causes the moveable plate 822 to move in direction "R", thus covering the recess 816 in which the handle 814 is located. In this manner access to the handle 814 can be denied to an operator, and the handle cannot be operated until the moveable plate is returned to the position depicted in FIG. 11. This embodiment can also be used where the release mechanism is something other than a handle. For example, if the release mechanism is a release button, the moveable plate can be used to cover the release button and keep the module from being released.

It is understood that the actuator 830 can be configured to operate in a manner similar to the actuators previously described (e.g., actuator 164 of FIG. 3). That is, the actuator can be configured to move the moveable plate 822 into the position which allows access to the handle 814 only after the actuator has received an authorization command from a controller in communication with the array. Likewise, the authorization command can be generated using the methods described previously.

In one variation on the embodiment depicted in FIGS. 11 through 13, the handle can be configured to stand-off from the front of the module after an operator has inserted the module into the chassis and pushed the handle inward to couple the connectors. The handle is configured such that in the stand-off position it can be grasped by an operator to allow the operator to physically remove the module from the chassis. Further, the recess 814 is sized such that when the handle is positioned within the recess, it cannot be grasped by an operator to release the handle. In this variation, there is no moveable plate 822. Rather, an actuator is provided which is connected to the handle and is configured to draw the handle into the recess 814 from the stand-off position. The actuator is further configured to push the handle out of the recess 814 so that it can be accessed by an operator. The actuator connects to the handle using a connector which disconnects from the handle when the handle is pulled outward from the module, and which connects to the handle when the handle is pushed inward to the stand-off position. In this variation the handle connector just described acts as the release mechanism securing member to move from a first position to allow access to the release mechanism, to a second position which denies access to the release mechanism.

In general, the embodiment of the invention which is depicted in FIGS. 11 through 13 includes providing a release mechanism which is configured to facilitate removal of a component from a structure which supports the component. A release mechanism securing member is configured to move from a first position which permits access to the release mechanism, to a second position which denies access to the release mechanism. The release mechanism securing member is moveable between the first and second positions by an actuator, and the actuator is responsive to an authorization command. The release mechanism securing member can be connected directly to the actuator, or it can be connected indirectly to the actuator. The release mechanism securing member can be connected to the release mechanism to move the release mechanism from a position where it can be accessed to a position where it cannot be accessed. Alternately, release mechanism securing member can be configured to block operation of the release mechanism.

Figure 5:
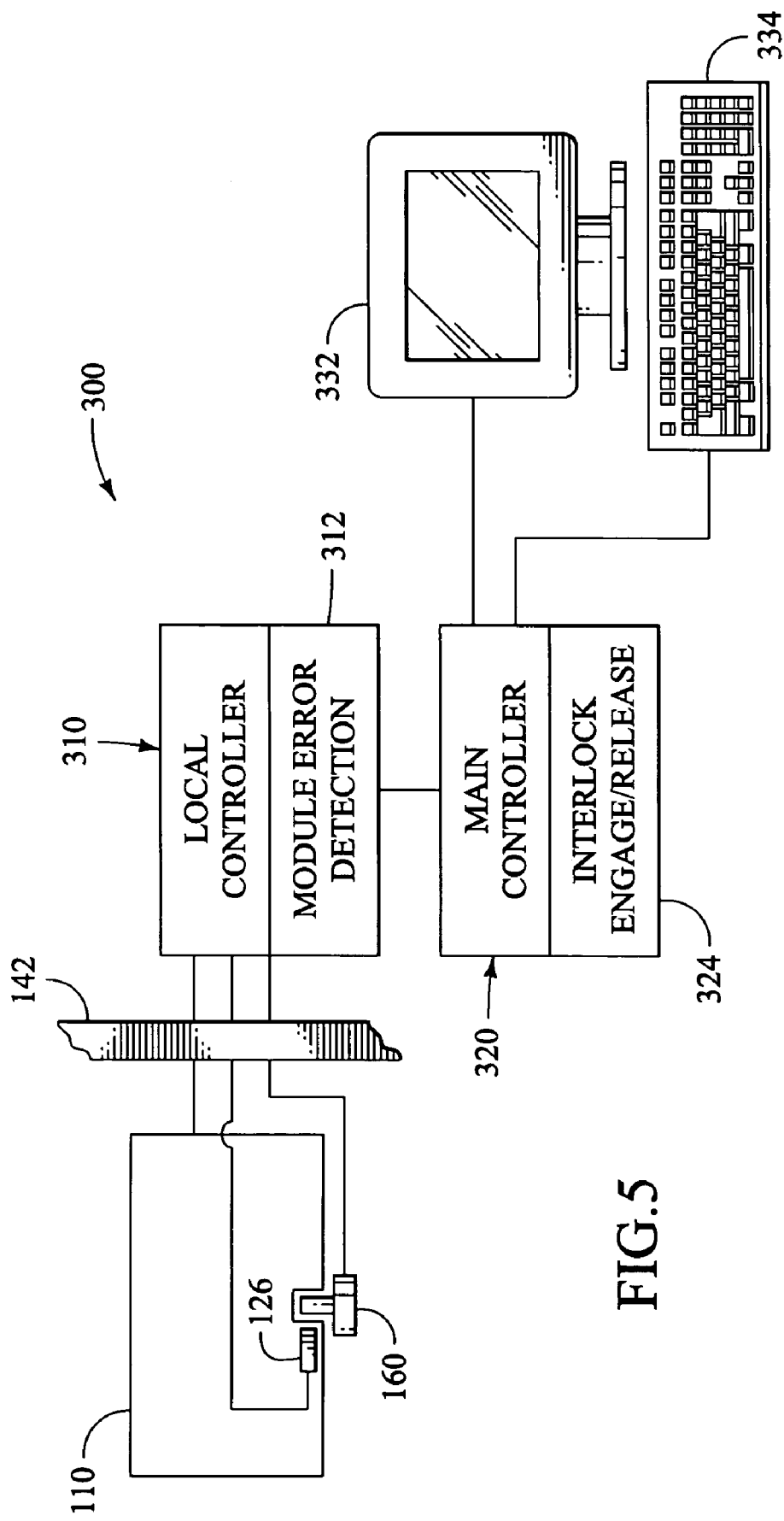
FIG. 5 is a schematic diagram of a computer system incorporating methods and apparatus of the present invention to allow authorized removal of modules in the system.

Turning now to FIG. 5, an electronic system employing an interlock device in accordance with the present invention is depicted in schematic form. The electronic system can be a computerized mass data storage system, comprising a plurality of memory arrays (not shown) such as the array "A" shown in FIG. 1. Each array comprises a plurality of modules. Only one such module 110 is shown in FIG. 5. This module corresponds to module 110 of FIGS. 2 and 3. The module 110 is in electrical and electronic communication with the plane 142, which is also in electrical and electronic communication with a local controller 310. The local controller can be housed within the same array as the module 110. The module 110 is further provided with the interlock device 160 which was shown and described in FIGS. 2 and 3 above. The module 110 is further provided with the securing member position sensor 126, which was also described above.

The local controller 310 is in electronic communication with a main controller 320, which can also be in electronic communication with a plurality of other arrays (not shown). The main controller 320 can also be provided with a user display, monitor 332, as well as a user input device, keyboard 334. The user display 332 allows a user or operator to receive information from the main controller 320 regarding system status. The user input device 334 allows a user or operator to interact with the main controller 320 and to direct the controller to take certain actions, for example, the user can direct the main controller to take a particular module in an array out of service.

The computer system 300 of FIG. 5 can be configured to operate in a number of different manners. We will now describe, by way of example only, some of the different possible operational configurations which can be achieved using the system 300 of FIG. 5. In all examples, it is assumed that the system is initially operating functionally to perform its primary objective, such as the storage of data in a large memory array configuration. It is further assumed that at least some of the modules in the system are provided with an interlock device as shown and described above, and further that each interlock device secures its respective module into its respective array when the module is operating in good order.

In one example, the local controller 310 can be provided with a local module error detection program 312, alternately known as a diagnostic program, which periodically polls the modules in the array and tests for operational defects, such as lost data (bad sectors on a memory disk), power fluctuations, and other such defects. Alternately, the modules themselves can be provided with internal diagnostic routines, and can be configured to notify the local controller 310 when a defect is detected. In either configuration, the local controller 310 becomes aware of a potentially defective module as a result of a diagnostic program. The local controller 310 then notifies the main controller 320 that there is a potentially defective module (module 110, for example). The main controller can then notify the operator via the user display 332 that module 110 is potentially defective, and should be removed for service. The user can then instruct the main controller 320, via the user input station 334, to make module 110 ready for removal for service. That is, the user issues a user authorization command, which will ultimately cause the interlock device actuator to be actuated, as described below.

In response to the instruction from the user to make module 110 available for removal, the main controller 320, via the interlock engage/release program 324, locates an alternate module within the system to perform the functions of module 110, and places the substitute module in service, and ceases routing information to the defective module 110. The substitute module can be within the same, or in a different array than module 110. The main controller 320 then instructs the local controller 310 to make module 110 available for service. That is, the main controller issues a main controller authorization command, which will ultimately cause the interlock device actuator to be actuated. In response to this instruction from the main controller, the local controller issues an authorization command to the actuator (164 of FIG. 2) instructing the actuator to move the securing member to the position depicted in FIG. 3. The interlock device 160 has now released the module 110, allowing the module to be removed from the array. The securing member sensor (126 of FIG. 3) can be used to notify the local controller 310 that the release of the interlock has been performed effectively. The local controller can then further electrically isolate the module 110 from the system. Once the module 110 has been prepared for removal by the local controller 310, the local controller notifies the main controller 320. The main controller 320 can then notify the user via the user display 332 that the module 110 is ready to be physically removed. The user can then remove module 110 from its array.

In a variation on the above example, rather than the main controller 320 notifying a user that module 110 may be defective and requesting user authorization to cause module 110 to be released, these steps can be performed automatically. That is, the authorization command to release the interlock can be automatically generated by the main controller 320. This allows the main controller to take any necessary steps to locate and put into service a back-up module for the potentially defective module, reducing the chance that data might be lost while waiting for a user to authorize release of the module.

In another example of the operation of the system 300 of FIG. 5, after a module, for example module 110, has been removed from an array for servicing, an opening in the array is present. The local controller 310 can then generate an authorization command to operate the interlock device 160 to cause the securing member (162 of FIG. 2) to move back into the secured position. This will prevent a module from being inserted into the opening in the array without an authorization command (either from a user, the main controller 320, or the local controller 310). In one variation, the array and/or the module can be provided with a verification device to verify to the system that the module being inserted into a given opening in the array is the correct module for that opening. Once the module has been verified by the verification device as being the correct module, the controller (local or main) can cause the interlock device to cycle to the unsecured position, allowing the module to be fully inserted into the opening.

After a module has been inserted into an opening, the controller (local or main) can perform a diagnostic routine to determine if the module is working correctly. The diagnostic routine can also verify that the module is the correct type of module, or the exact module required, for the opening, commensurate with the functions to be performed by the module appropriate for the opening. For example, if the diagnostic routine determines that the module is a memory module, but the opening has been designated as an opening for a power supply, then the diagnostic program will determine that the module is the wrong module for the opening. If the controller determines that the module should not be put into service for whatever reason, it can then notify the user via the user interface 332 that the module has not been put into service, and the reason therefore. However, if the module is confirmed as being acceptable to the system, then the controller 310, either directly or as authorized by the main controller 320, can cycle the interlock device 160 from the unsecured position to a secured position, thus securing the module within the opening. At this point the module can be put into service.

Figure 6:
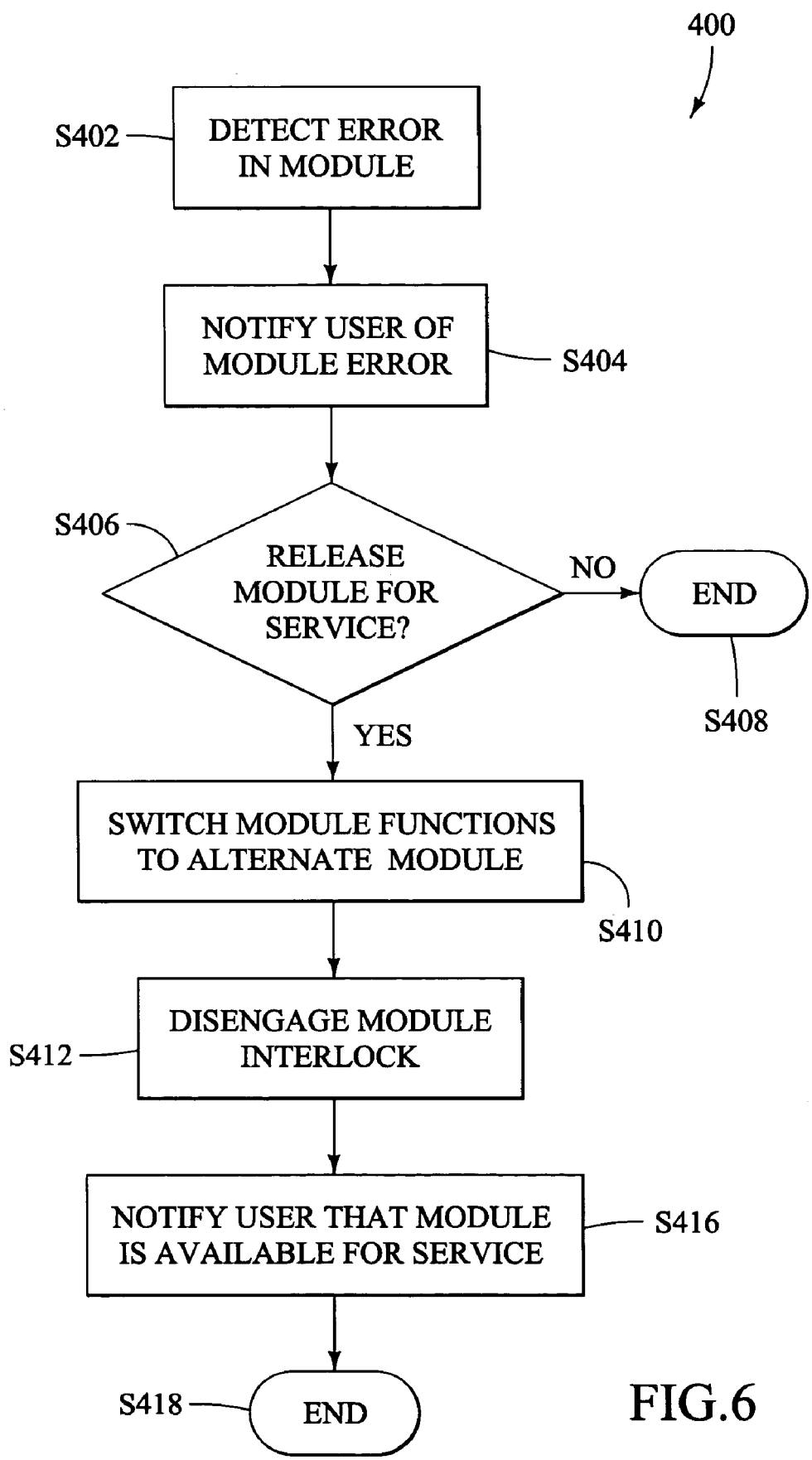
FIG. 6 is a flow chart depicting a sequence for removing a defective module from a computer system using methods and apparatus in accordance with the present invention.
Figure 7:
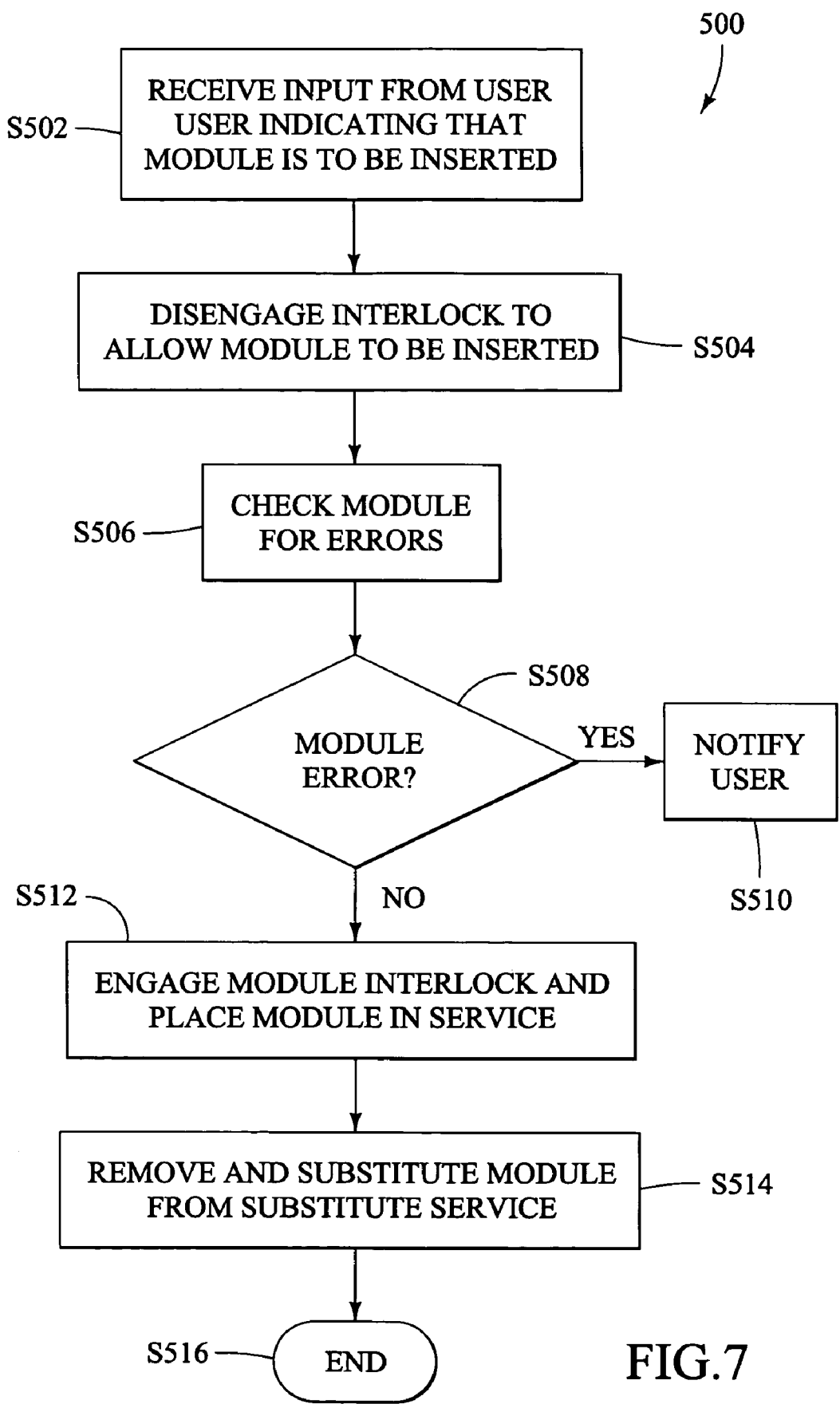
FIG. 7 is a flow chart depicting a sequence for inserting a module into a computer system using methods and apparatus in accordance with the present invention.

Turning now to FIGS. 6 and 7, flowcharts are provided which show the methods for practicing certain of the examples discussed above for the computer system of FIG. 5. In FIG. 6, a flowchart 400 depicts the sequence of steps for removing a module from an array using the interlock device of the present invention. It is assumed that at the time the process begins the module is secured in the array by an interlock device, such as device 160 of FIG. 5. At step S402, an error or potential defect in a module is detected. This can be performed by a controller using a diagnostic program, as described above. At step S404 a user or operator is notified of the existence of the defective module. This can be accomplished by the main controller 320 and the user interface 332 of FIG. 5. Once the user has been notified, a decision is made at step S406 (in this case by the user) whether or not to remove the module for service or replacement. If the decision is made to not remove the module, then at step S408 the process terminates, and the module remains secured in the array by the interlock device.

However, if the user decides that the potentially defective module identified in step S402 should be removed, then the user gives an authorization commend of "yes", and the process moves on to step S410. In step S410, the main controller (320 of FIG. 5) acts to switch the potentially defective module's function to an alternate module. It is understood that this step can alternately be performed between steps S402 and S404 to reduce the chance that data will be lost as a result of continuing to use the potentially defective module. Once the module has been electronically isolated (i.e., is no longer being used as a functional module in the system), then at step S412 the interlock device on the potentially defective module is cycled to unsecure the module from the array. As described above, this can be performed by the main controller 320 of FIG. 5 giving a command to the local controller 310 to disengage the module, the local controller then activating an actuator (such as 164 of FIG. 3) to move a securing member (162 of FIG. 3) to a position which allows the module to be removed from the array.

Once the interlock device has been actuated to release the module, the main controller can notify the user at step S416 that the module is available to be removed for service or replacement. This then ends the process at step S418. At this point the user can remove the potentially defective module from the array in which it is located.

Turning now to FIG. 7, a process flow chart 500 for inserting a module into an array using an interlock device in accordance with the present invention is depicted. The process shown in the flow chart 500 of FIG. 7 can follow the process described by the flow chart 400 of FIG. 6. That is, after the defective module has been removed according to the process of FIG. 6 and serviced, the module can be reinstalled, or a replacement module can be installed, in the opening made available by the removal of the original module. It is assumed at the start of the process depicted in FIG. 7 that an open slot is available in an array to receive a module, and that the slot is provided with an interlock device such as the device 160 of FIG. 2. It is further assumed that the interlock has been cycled such that the securing member (162 of FIG. 2) is in the "secured" position, preventing a module from being fully inserted into the slot and coupled to the plane (142, FIG. 2).

In the first step S502 of flow chart 500, a user or operator provides a user authorization command to a controller (e.g., main controller 320 of FIG. 5) that the user desires to insert a module into the selected opening in the array. This step can further incorporate an interactive process between the user and the main controlled whereby the user queries the controller as to the availability of slots to receive a module, and whether a particular slot is an acceptable slot, or perhaps even the designated slot for the intended module to be inserted. Once the controller has received sufficient authorization to receive the module, consistent with the configuration of the controller as just described, at step S504 the controller disengages the interlock device in the slot which is designated to receive the module. This can be performed by the main controller 320 of FIG. 5 giving a controller authorization command to a local controller 310 to release the slot, and the local controller cycling the interlock device 160 to allow a module to be fully inserted into the slot or opening. At this point, the user inserts the module into the opening, allowing the first connector on the module (122 of FIG. 2) to couple with the second connector (144) on the plane (142). The user can then notify the main controller that the module has been inserted. Alternately, the local controller can be configured, via a sensor, to detect the presence of the inserted module. In any event, once the system recognizes that the module has been fully inserted into the opening and the connectors have coupled, then at step S506 of FIG. 7 a diagnostic program can be performed to determine if the proper module has been inserted, and whether the module is operating correctly.

At step S508, if the diagnostic routine performed in step S506 indicates that there is a module error—either the module is potentially defective, or the module is not the module which should be inserted into the opening into which the modules was installed—then at step S510 a user is notified (e.g., via the user display 332 of FIG. 5), the module is not put into service, the interlock is not engaged, and the process ceases. However, if the module is confirmed by the diagnostic routine as being acceptable, then at step S512 the controller (local or main) gives an authorization command to engage the interlock to secure the module in the array, and the module is put into service. At this point, the module essentially cannot be accidentally removed from the array due to the interlock. Then at step S514 any substitute or back-up module which was being used to perform the functions of the module which was previously removed is taken out of service regarding those functions. It is understood that the substitute module can then be employed for other uses and functions. At step S516 the process ends. The process can then revert to monitoring the system for module errors, and if an error is detected, the process depicted in the flow chart 400 of FIG. 6 can be initiated.

It is understood that FIGS. 6 and 7 provide flow charts for only two examples of processes for using an interlock device in accordance with the present invention, and that other processes can be equally practiced using the methods and apparatus of the present invention.

A method in accordance with the present invention provides a method for securing a first connector to a second connector. The connectors can be electrical connectors, or other types of connectors as described earlier. The first connector can be supported by a first structure, and the second connector can be supported by a second structure. The method includes the step of providing an arresting surface which can be used to restrict movement of the first connector relative to the second connector where such movement would cause decoupling of the connectors when they are coupled. The arresting surface can be affixed to the first connector directly, or to the first surface when it is present. The method further includes providing a moveable securing member. The securing member is first moved to a first position which allows relative movement between the connectors. One of the two connectors is then moved relative to the other connector to bring the two connectors onto conductive contact. That is, the connectors are coupled to one another. An authorization command is then given to authorize the securing member to move from the first position to a second position in proximity to the arresting surface, whereby the arresting surface will restrict relative movement between the first and second connectors. The securing member is then moved to the second position in accordance with the authorization command.

The method can further include the step of providing a second authorization command to move the securing member back to the first position, and the securing member is then moved back to the first position in response to the command. One of the connectors can then be moved relative to the other connector to move the connectors out of mating contact, i.e., to decouple the connectors. Additionally, a user can be notified when the securing member has been moved back to the first position.

While the above invention has been described in language more or less specific as to structural and methodical features, it is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A disk array system comprising a plurality of disk devices and a chassis, the disk devices being removably supported in the chassis, and at least one apparatus configured to secure at least one of the disk devices in the chassis, the securing apparatus responsive to an authorization command to mechanically move between a lock position and unlock position, wherein the lock position prevents a user from removing the at least one disk device from the chassis in absence of the authorization command and the unlock position allows the user to remove the at least one disk device from the chassis in presence of the authorization command.

2. The disk array system of claim 1, and wherein the securing apparatus comprises a solenoid that moves into an opening in the chassis in the lock position and moves out of the opening in the unlock position.

3. The disk array system of claim 1, and wherein the at least one disk device comprises a release mechanism configured to release the disk device from the chassis when the release mechanism is actuated by the user, and further wherein the securing apparatus comprises a moveable release mechanism securing member configured to be moved, in response to the authorization command, from a first position which allows the user access to the release mechanism, to a second position which denies the user access to the release mechanism.

4. The disk array system of claim 1, and further comprising a controller configured to detect when the at least one disk device has been removed from service, and to subsequently generate the authorization command.

5. The disk array system of claim 1, and further comprising a controller configured to remove the at least one disk device from service and thereafter generate the authorization command in response to an error detection signal.

6. The disk array system of claim 5, and wherein the controller is further configured to provide a user notification signal in response to the error detection signal.

7. The disk array system of claim 1, and further comprising a controller configured to remove the at least one disk device from service and thereafter generate the authorization command in response to a user input.

8. The disk array of claim 1, and further comprising an indicator light electrically coupled to the securing apparatus, the indicator light configured to indicate a removability status of the at least one disk device.

* * * * *

UNITED STATES PATENT AND TRADEMARK OFFICE
CERTIFICATE OF CORRECTION

PATENT NO. : 7,239,522 B2  
APPLICATION NO. : 10/874727  
DATED : July 3, 2007  
INVENTOR(S) : Robert A. Rust et al.

Page 1 of 1

It is certified that error appears in the above-identified patent and that said Letters Patent is hereby corrected as shown below:

In column 10, lines 39-40, delete "FIGS. 24" and insert -- FIGS. 2-4 --, therefor.

In column 18, line 36, in Claim 8, after "array" insert -- system --.

Signed and Sealed this

Fifth Day of August, 2008

JON W. DUDAS  
*Director of the United States Patent and Trademark Office*